(12) United States Patent
Han et al.

(10) Patent No.: US 8,243,391 B2
(45) Date of Patent: Aug. 14, 2012

(54) SLIDER AND SUSPENSION COMPOSITE FIBER SOLDER JOINTS

(75) Inventors: Yufei Han, Singapore (SG); Hanxiang He, Singapore (SG); Shaoyong Liu, Singapore (SG); Boon Kee Tan, Singapore (SG)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 623 days.

(21) Appl. No.: 12/239,507

(22) Filed: Sep. 26, 2008

(65) Prior Publication Data

US 2010/0079914 A1  Apr. 1, 2010

(51) Int. Cl.
    *G11B 5/60* (2006.01)
(52) U.S. Cl. .................................... 360/234.5
(58) Field of Classification Search .......... None
    See application file for complete search history.

(56) References Cited

U.S. PATENT DOCUMENTS

| | | | |
|---|---|---|---|
| 5,089,356 A | 2/1992 | Chung | |
| H1306 H * | 5/1994 | Drach | 228/262.2 |
| 5,520,752 A | 5/1996 | Lucey, Jr. et al. | |
| 6,039,918 A | 3/2000 | Hegner et al. | |
| 6,137,183 A * | 10/2000 | Sako | 257/783 |
| 6,774,314 B2 | 8/2004 | Toyoshima et al. | |
| 7,554,769 B2 * | 6/2009 | Yamakura et al. | 360/234.5 |
| 7,600,667 B2 * | 10/2009 | Hwang | 228/180.22 |
| 7,619,856 B2 * | 11/2009 | Matsumoto et al. | 360/234.5 |
| 7,681,302 B2 * | 3/2010 | Kamigama | 29/603.03 |
| 7,701,673 B2 * | 4/2010 | Wang et al. | 360/245.3 |
| 7,719,798 B2 * | 5/2010 | Yao | 360/294.4 |
| 7,722,962 B2 * | 5/2010 | Soga et al. | 428/620 |
| 7,733,607 B2 * | 6/2010 | Yao et al. | 360/245 |
| 7,886,422 B1 * | 2/2011 | Zhou et al. | 29/603.02 |
| 2002/0149113 A1 | 10/2002 | Ray et al. | |
| 2004/0112478 A1 | 6/2004 | Bieler et al. | |
| 2006/0120911 A1 * | 6/2006 | Gupta et al. | 419/19 |
| 2006/0139809 A1 * | 6/2006 | Matsumoto et al. | 360/234.5 |
| 2008/0062565 A1 * | 3/2008 | Umezaki et al. | 360/234.3 |
| 2009/0091860 A1 * | 4/2009 | Dela Pena et al. | 360/254 |
| 2010/0084764 A1 * | 4/2010 | Hwang | 257/737 |
| 2010/0321829 A1 * | 12/2010 | Hutchinson et al. | 360/234.5 |

FOREIGN PATENT DOCUMENTS

| | | |
|---|---|---|
| DE | 3838968 | 8/1989 |
| JP | 56-054046 | 5/1981 |
| JP | 03-237074 | 10/1991 |
| JP | 06-020522 | 1/1994 |
| JP | 07-040077 | 2/1995 |
| WO | WO-2008/005399 | 1/2008 |

OTHER PUBLICATIONS

Hongtao, Chen et al., "Mechanical Shock Modeling and Testing of lead-free solder joint in Hard Disk Drive Head Assembly", *State Key Laboratory of Advanced Welding Production Technology, Harbin Institute of Technology 2005 International Conferences on Asian Green Electronics*, (2005),192-196.

* cited by examiner

*Primary Examiner* — Mark Blouin

(57) ABSTRACT

Systems and methods for a slider and suspension assembly are discussed. The slider and suspension assembly comprises a slider, a suspension, and composite fiber solder. The composite fiber solder is coupled to the suspension and coupled to the slider. The composite fiber solder comprises a fiber, wherein the fiber is configured to increase a fracture resistance of the composite fiber solder compared to a solder without the fiber.

20 Claims, 4 Drawing Sheets

SLIDER AND SUSPENSION COMPOSITE FIBER SOLDER JOINTS

FIELD

Embodiments of the present technology relate generally to the field of solder joints.

BACKGROUND

As hard disk drives are being made smaller, solder joints may also be made smaller. Smaller solder joints may lead to an increased susceptibility to stress related failures. Solder joint failures may lead to disk failures, such as open write failure, poor read/write performance, and the like.

SUMMARY

Systems and methods for a slider and suspension assembly are discussed herein. The slider and suspension assembly comprises a slider, a suspension, and composite fiber solder. The composite fiber solder is coupled to the suspension and coupled to the slider. The composite fiber solder comprises a fiber, wherein the fiber is configured to increase a fracture resistance of the composite fiber solder compared to a solder without the fiber.

BRIEF DESCRIPTION OF THE DRAWINGS

The accompanying drawings, which are incorporated in and form a part of this specification, illustrate embodiments of the presented technology and, together with the description, serve to explain the principles of the presented technology.

The drawings referred to in this description should not be understood as being drawn to scale unless specifically noted.

DESCRIPTION OF EMBODIMENTS

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Figure 1:
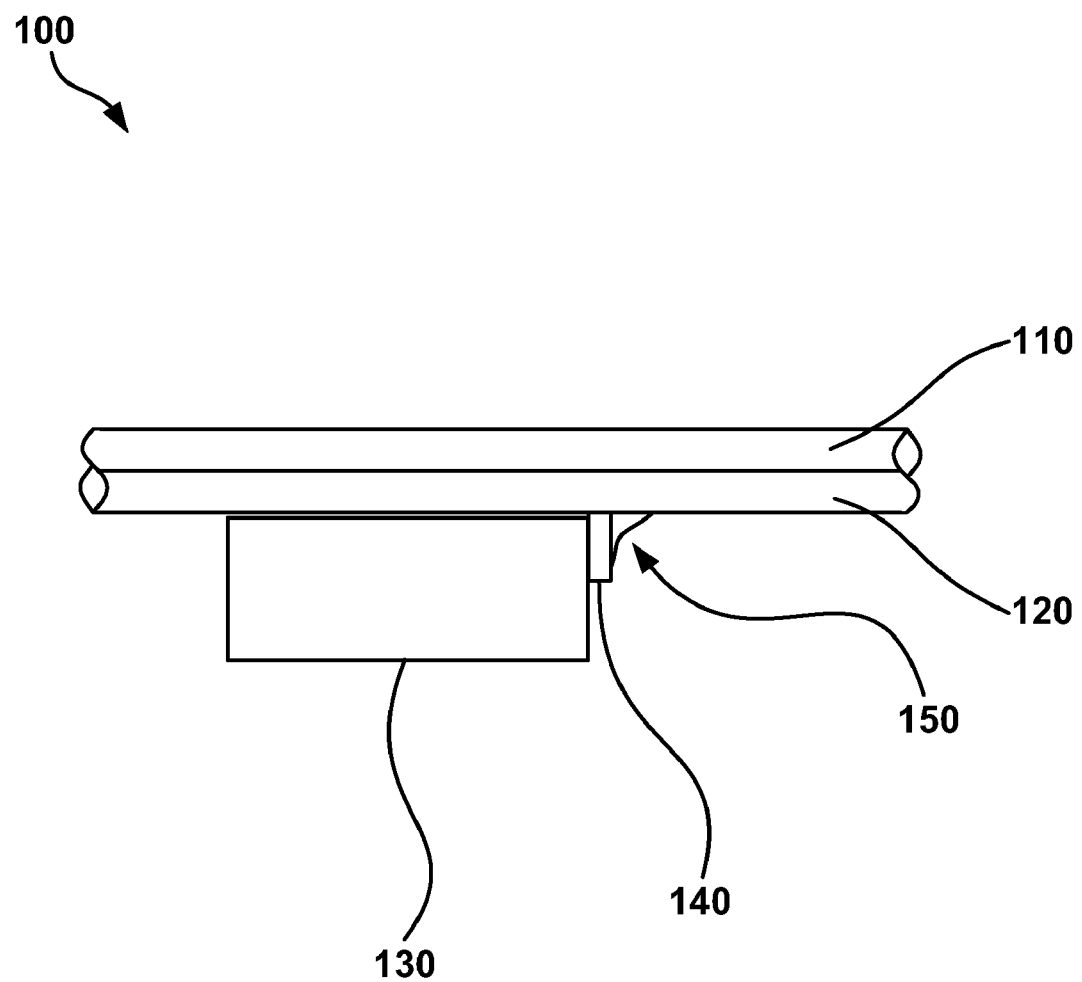
FIG. 1 is a side view of a slider and suspension assembly, in accordance with an embodiment of the present technology.

FIG. 1 is a side view of a slider and suspension assembly 100, in accordance with an embodiment of the present technology. The assembly 100 comprises a substrate 110, a suspension 120, and a slider 130. The slider 130 comprises one or more pads 140. One or more solder joints 150 couples the suspension 120 and the pads 140. In some embodiments, the slider 130 and the suspension 120 are coupled via a gimble (not depicted). The suspension 120 may be an integrated lead suspension, an electrical lead suspension, or other suspension that couples to the pads 140 via the solder joints 150.

The solder joint 150 contains a composite solder material instead of using pure solder. The composite solder material may be a mixture of standard solder with a fiber to form a composite fiber solder. A standard solder may include lead, such as a solder alloy with a tin-lead ratio of 63/37, or may be lead free, such as a solder allow containing a combination of two or more metals of tin, copper, silver, bismuth, indium, zinc, antimony, and/or traces of other metals.

In one embodiment the fiber is an electrically conductive fiber, such as carbon fiber, metallic fiber, conductive polymer, and the like. In another embodiment, the fiber is an electrically non-conductive fiber, such as ceramic fiber, and the like. The fiber generally has a higher melting point than that of the solder joint before the addition of the fiber. For example, a tin-lead solder with a melting point of 183° C. may be combined with an aluminum fiber with a melting point of 660° C. The higher melting point of the fiber helps maintain the fiber in a solid state form during soldering.

The fiber functions as a network-like structure inside the solder joint to strengthen the solder joint. The network structure helps to distribute stresses evenly over the solder joint thus reducing localized stresses induced in the solder joint. The network structure prevents and/or reduces the solder joint failure as compared to solder joints which do not utilized a composite fiber solder. Also, in various embodiments, the composite fiber solder joint has an increased stress-induced fracture resistance due to the addition of the fibers, while retaining properties of the solder prior to the additional of the fiber, such as such solderability, operating temperature, thermal and electrical conductivity, and the like.

With the addition of fiber, the increased fracture resistance reduces susceptibility to load/unload stresses, seeking stresses, crash stop stresses, drop/shock stresses, isothermal temperature stresses, and/or like stresses. Load/unload stresses may occur while the slider 130 is loaded onto and/or unloaded from a disk surface from a ramp for read-write operation. Seeking stresses may occur when the slider 130 seeks across a disk surface. Crash stop stress may occur when the slider 130 comes to a sudden stop as the slider 130 collides with something, such as a ramp. Crash stop stresses are mainly tangential and may shear the solder joint. Drop/shock stresses may occur when a hard disk drive is dropped, and the like. Isothermal temperature stresses may occur as a temperature of the hard disk drive increases during operation and different materials at the solder joint expand at different rates.

Figure 2:
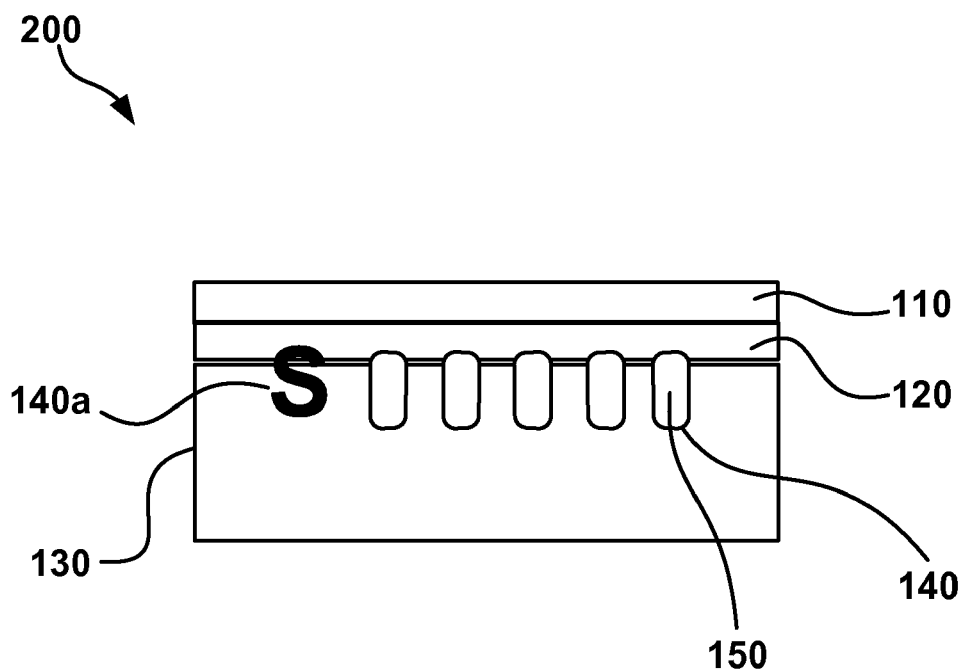
FIG. 2 is a front view of the slider and suspension assembly of FIG. 1, in accordance with an embodiment of the present technology.

FIG. 2 is a front view 200 of the slider and suspension assembly 100 of FIG. 1, in accordance with an embodiment of the present technology. The front view illustrates pads 140 of the slider 130. In one embodiment, and as depicted, there are six pads 140. In other embodiments, there may be more or less pads, such as four or nine pads. Each of the pads 140 has one solder joint 150 which couples the suspension 120 to the pad 140.

In various embodiments, the pads 140 are formed in an S-shape (shape depicted as element 140a) to allow pads 140a to deform and absorb any relative motion between the slider 130 and the suspension 120. The S-shape of pads 140a may further allow pads 140a to deform and absorb any strain that may result from contraction of the solder during a soldering process, for example, a reflow process.

Figure 3:
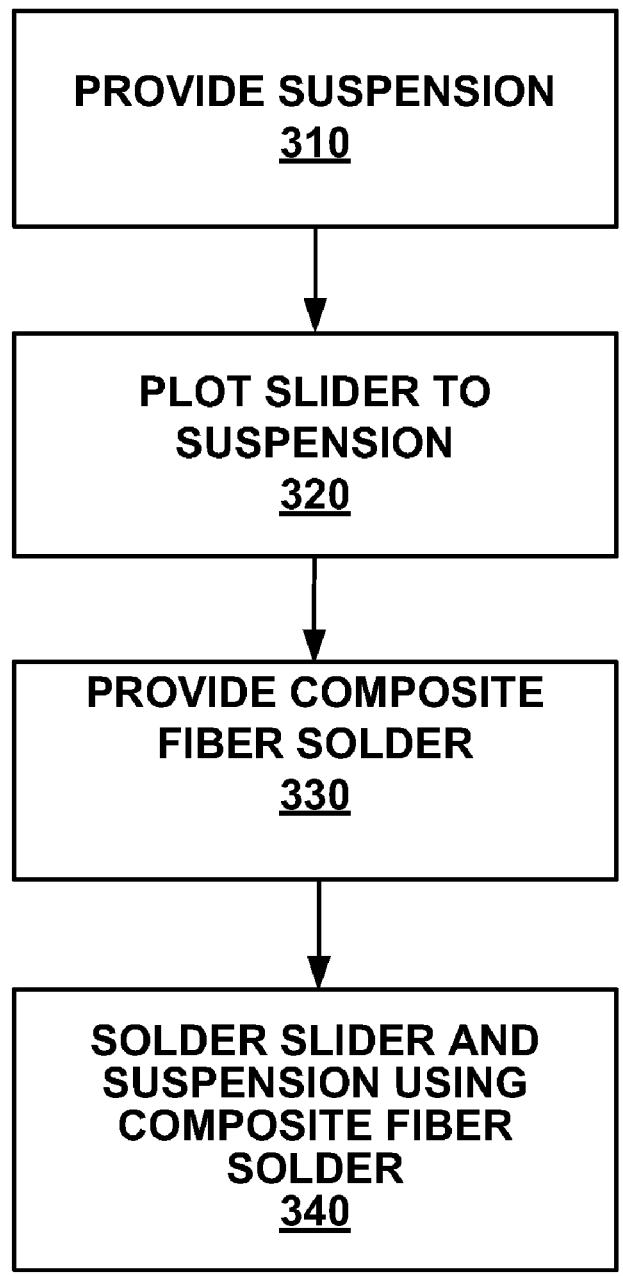
FIG. 3 is a flow diagram of an example method of manufacturing a slider and suspension assembly, in accordance with an embodiment of the present technology.

FIG. 3 is a flow diagram of an example method of manufacturing a slider and suspension assembly, in accordance with an embodiment of the present technology. In step 310, the suspension 120 is provided. In some embodiments, an epoxy is applied to the suspension 120 via an auto dispenser.

In step 320, the slider 130 is plotted (aligned and positioned) to the suspension 120. In various embodiments, the slider 130 is auto-plotted onto the suspension. After the slider is plotted, the epoxy, if used, is cured in an oven. The curing bonds the slider 130 onto the suspension 120.

In step 330, the composite fiber solder is provided. In one embodiment, the composite fiber solder is prepared. The composite fiber solder may be prepared in several ways. For example, the fiber and solder may be combined to form the composite fiber solder by mixing the fiber into a melted solder, mixing the fiber into a solid solder and melting the solder, and the like. The solder used to prepare the composite fiber solder may be selected for particular desired properties. For example, a base solder with a volume of 60/40 lead tin is used as the base solder as the 60/40 lead tin composition may have a greater stress resistance than other solders with different compositions. Also, the type of fiber used in preparation of the composite fiber solder may be selected based on a desired type of increased stress resistance. For example, in one embodiment where increased resistance to isothermal stresses is desired, a volume of 60/40 lead tin solder is mixed with an equal volume of carbon fiber. In one embodiment where increased resistance to start/stop stresses is desired, a volume of 60/40 lead tin solder is mixed with 8020 aluminum fiber which is approximately 20% of the volume of the 60/40 solder. It is appreciated that many other compositions are possible. In another embodiment, two or more different fibers may be used to prepare the composite fiber solder to increase the stress resistance of one or more differences stress. After melting the solder, the composite fiber solder is cooled and may be shaped into several different shapes, such as a wire, solder ball, and/or any other desired shape.

In some embodiments, the composite fiber solder may be prepared independent of the plotting of the slider 130 and the suspension 120. In other embodiments, the composite fiber solder is prepared just prior to soldering.

In step 340, the slider 130 and suspension 120 are soldered using the composite fiber solder. In various embodiments, an automatic solder ball bonding machine is used to solder the slider 130 and suspension 120 using a solder ball. The solder ball diameter and/or size may vary depending on a weld joint size, the pad size, the solder machine, and the like. In one embodiment the solder ball is approximately 90 micrometers.

Other coupling and/or soldering techniques may be used and are in accordance with an embodiment of the present technology. Coupling means known in the industry may comprise, but are not limited to, several metal reflow techniques for effecting the coupling of metals. These techniques are presented as examples only and are not intended to limit the scope of the present technology. Examples of electrical coupling means known in the industry are: laser welding, ultrasonic bonding, conductive epoxy, and solder reflow. Solder reflow may comprise, but is not limited to: reflowing a tinned pad, placing a solder preform on the pad followed by a reflow process, and placing solder paste on the pad followed by a reflow process. Solder reflow may utilize a number of heat sources. Examples of sources for radiated heat known in the industry are focused infrared light and laser beam.

Figure 4:
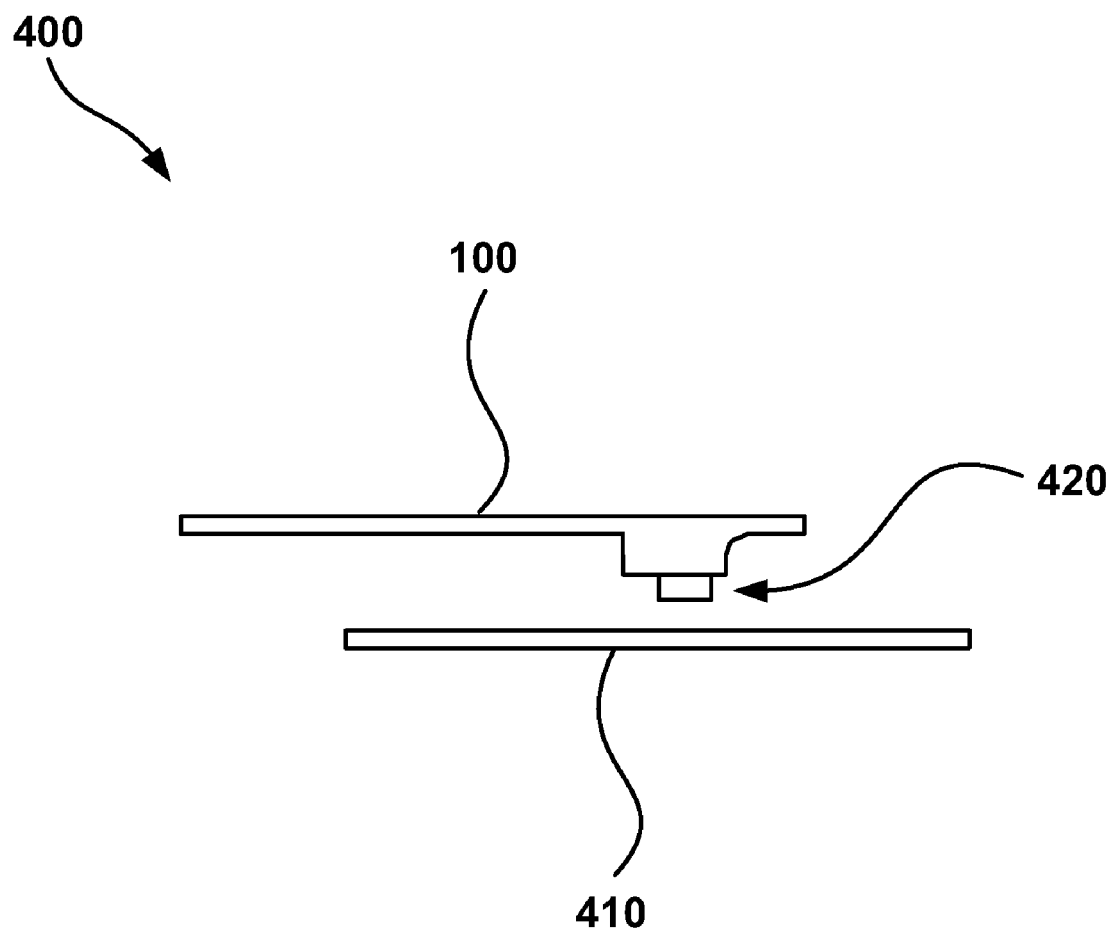
FIG. 4 is a view of a hard disk drive, in accordance with an embodiment of the present technology.

FIG. 4 is a view of a hard disk drive 400, in accordance with an embodiment of the present technology. The hard disk drive 400 comprises a slider and suspension assembly 100, a hard disk 410, and a head 420. The slider and suspension assembly is coupled to the head 420. The head is configured to communicate with the hard disk 410. Hard disk drives have well known methods, procedures, components, and circuits that have not been described in detail as not to unnecessarily obscure aspects of the embodiments of the present invention.

The foregoing descriptions of example embodiments have been presented for purposes of illustration and description. They are not intended to be exhaustive or to limit the teaching to the precise forms disclosed. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A slider and suspension assembly comprising:
a slider;
a suspension; and
a composite fiber solder formed in an S-shape coupled to the suspension and coupled to the slider, the composite fiber solder comprises a fiber and wherein said S-shape enables deformation of said composite fiber solder to absorb strain, wherein said composite fiber solder is in said S-shape prior to coupling with said slider.

2. The assembly of claim 1, wherein the composite fiber solder comprises a solder ball.

3. The assembly of claim 1, wherein the composite fiber solder comprises a wire.

4. The assembly of claim 1, wherein the fiber is electrically conductive.

5. The assembly of claim 1, wherein the fiber is electrically non-conductive.

6. The assembly of claim 1, wherein the fiber is configured to reduce susceptibility to load/unload stresses compared to a solder without the fiber.

7. The assembly of claim 1, wherein the fiber is configured to reduce susceptibility to seeking stresses compared to a solder without the fiber.

8. The assembly of claim 1, wherein the fiber is configured to reduce susceptibility to crash stop stresses compared to a solder without the fiber.

9. The assembly of claim 1, wherein the fiber is configured to reduce susceptibility to drop/shock stresses compared to a solder without the fiber.

10. The assembly of claim 1, wherein the fiber is configured to reduce susceptibility to isothermal temperature stresses compared to a solder without the fiber.

11. A method of soldering joints comprising:
providing a suspension;
plotting a slider to the suspension;
providing a composite fiber solder formed in an S-shape; and
soldering the slider and the suspension using the composite fiber solder, wherein said S-shape enables deformation of said composite fiber solder to absorb strain in said pad during said soldering, wherein said composite fiber solder is in said S-shape prior to said soldering.

12. The method of claim 11, further comprising applying an epoxy to the suspension; and after the plotting and prior to the soldering, curing the epoxy.

13. The method of claim 11, further comprising preparing the composite fiber solder.

14. The method of claim 13, wherein the preparation of the composite fiber solder further comprises mixing a fiber and melted solder.

15. The method of claim 13, wherein the preparation of the composite fiber solder further comprises mixing a fiber and solid solder; and applying heat to the fiber and the solid solder above a melting temperature of the solid solder.

16. The method of claim 13, wherein the preparation of the composite fiber solder further comprises forming the composite fiber solder into a wire.

17. The method of claim 13, wherein the preparation of the composite fiber solder further comprises forming the composite fiber solder into a solder ball.

18. The method of claim 17, further comprising providing a solder ball bonding machine, and wherein the soldering further comprises using the solder ball bonding machine to perform the soldering.

19. A hard disk drive comprising:
a hard disk;
a head configured to communicate with the hard disk; and
a slider and suspension assembly coupled to the head, the slider and suspension assembly comprising,
a slider,
a suspension, and
a composite fiber solder formed in an S-shape coupled to the suspension and coupled to the slider, the composite fiber solder comprises a fiber, wherein said S-shape enables deformation of said composite fiber solder to absorb strain, wherein said composite fiber solder is in said S-shape prior to coupling with said slider.

20. The hard disk drive of claim 19, wherein the fiber is electrically conductive, and
wherein the fiber is configured to increase a fracture resistance of the composite fiber solder compared to a solder without the fiber.

* * * * *